Sept. 27, 1932.    C. D. AINSWORTH    1,879,000
METAL CLAD SWITCH GEAR AND INCLOSED CONDUCTOR SYSTEM THEREFOR
Filed May 15, 1930    2 Sheets-Sheet 1

Inventor,
Chester D. Ainsworth
by
atty

Sept. 27, 1932.  C. D. AINSWORTH  1,879,000
METAL CLAD SWITCH GEAR AND INCLOSED CONDUCTOR SYSTEM THEREFOR
Filed May 15, 1930  2 Sheets-Sheet 2

Inventor,
Chester D. Ainsworth
by
atty

Patented Sept. 27, 1932

1,879,000

UNITED STATES PATENT OFFICE

CHESTER D. AINSWORTH, OF WOLLASTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

METAL CLAD SWITCH GEAR AND INCLOSED CONDUCTOR SYSTEM THEREFOR

Application filed May 15, 1930. Serial No. 452,623.

This invention relates to metal clad switch gear and to inclosed conductor systems therefor.

In a switching system involving the use of metal clad switch gear the high tension bus conductors are extended along the line of switches and are inclosed in metal ducts or casings which are, in effect, continuous throughout the line of switches. The conductors are insulated from the casing wall by oil or other insulating compound. For a switching system of substantial size the conductor inclosing casings are of considerable length, as upwards of fifty feet. Insulated terminals are carried by the casings for connection with the switches; and the casings are rigidly supported at suitable points along the lengths thereof. The bus conductors are also secured to and supported by insulators carried by the inclosing casings. Due to the considerable length of the casings, they undergo considerable variation in length due to expansion and contraction and thereby impose strains on their supports and also between the insulated bus terminals and the switch terminals associated therewith. The expansion of the casings and of the bus conductors is usually different because of the different materials of which they are constructed; and the buses usually expand more than the inclosing casings since they are not only subjected to the ambient temperature variations but also are heated by the current traversing them. Thus, expansion strains are imposed between the long buses and the long inclosing casings.

It is an object of the present invention to reduce the various above-described strains by sectionalizing the inclosing casings along the lengths thereof and connecting the sections in a fluid tight manner so that the various sections can expand and contract independently of each other.

It is also an object of the invention to sectionalize the rigid bus conductors into sections corresponding with the casing sections and to connect the bus sections flexibly together preferably by flexible conductors which are free from restraining connection with the inclosing casings, so that each bus section can expand and contract without imposing any strains on the associated bus sections.

It is a further object of the invention to provide a flexible connecting means between two adjacent casing sections, which connecting means also establishes fluid communication between the sections, and to extend the flexible connecting means between the bus sections through the flexible casing-connecting means. With this arrangement, the casing and bus sections can be so short that variations in the lengths thereof due to temperature changes are unimportant, and the sections are connected flexibly together so that the change of length of the sections is not cumulative lengthwise of the sections.

A further object of the invention is the provision of an electric switch gear having separate conductor-enclosing sections that can be readily assembled with the associated switches at the factory and shipped in assembled condition and wherein the sections are connected in line by a flexible connecting means, whereby economy of manufacture and assembling is obtained.

It is a further object to provide flexible connections between the various sections, so that extreme accuracy of alignment between them is unnecessary.

Figure 1:
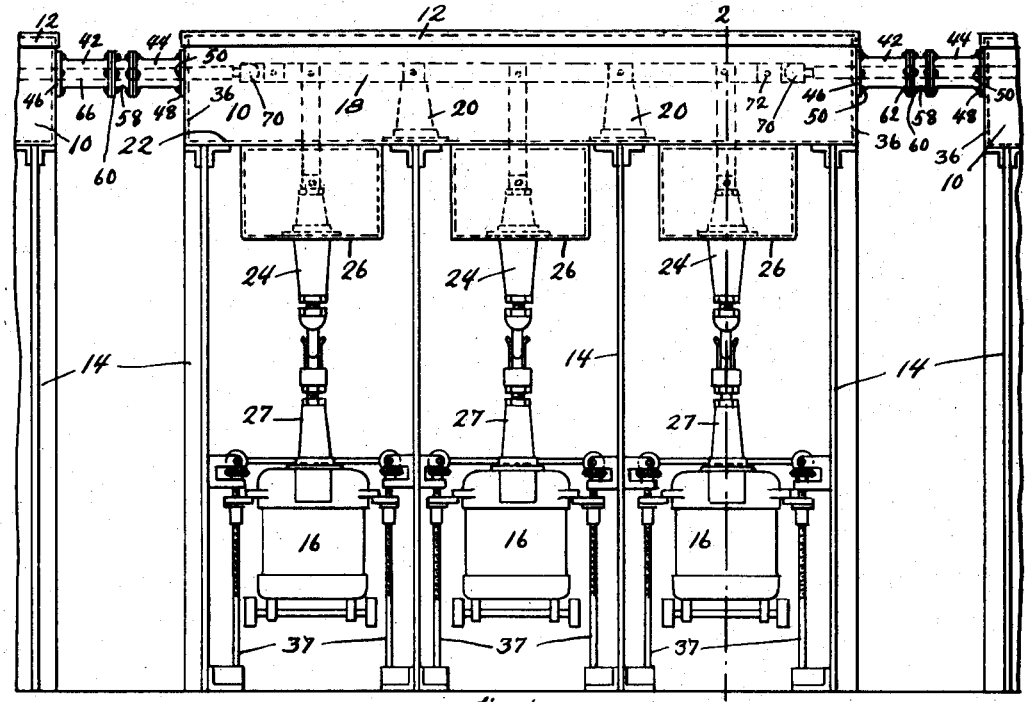
Fig. 1 is a front elevation of metal clad switch gear embodying the present invention.
Figure 2:
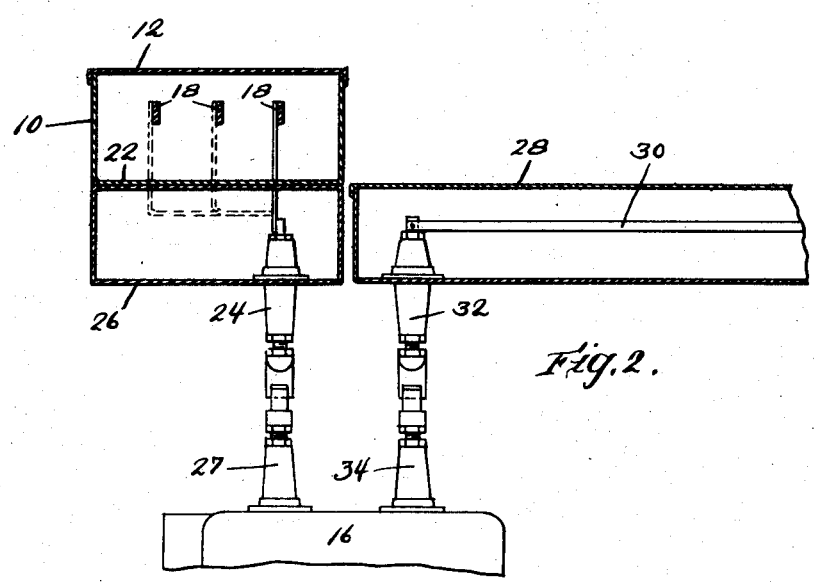
Fig. 2 is a section taken along line 2—2 of Fig. 1.

As here shown, the metal clad switch gear embodying the present invention includes a horizontally extended metal conductor-enclosing casing 10 having a suitable cover 12 and supported in elevated position by a suitable frame 14 above a plurality of separate single phase switches 16. The system here shown is adapted for three-phase operation and thus is provided with three similar switches 16 which constitute a unitary switching apparatus. Three high tension bus conductors 18 are extended horizontally of said casing in spaced relation therein and are supported on suitable insulated pedestals 20 which are carried by an intermediate wall 22 of the casing. The casing is provided with high tension terminals 24 which consist of insulating bushings that are carried by the bottom wall 26 of the casing and extend therethrough for connection each with terminals 27 of the switches. The three insulated terminals 24 are each connected with a separate one of the bus conductors 18. The casing 10 is adapted to be filled with oil or other suitable insulating medium which can be poured into the casing to insulate the buses from each other and from the side walls of the casing. Other casings 28 are located adjacent the casing 10 and each contains a conductor 30 which is connected to a suitable distribution circuit. Said conductor, within said casing, is connected with an insulated terminal consisting of an insulating bushing 32 that extends through the bottom wall of said casing and is adapted for connection with another switch terminal 34. Thus, each conductor 30 is connected through a separate switch with a separate one of the bus conductors 18. The switches preferably are adapted separately to be raised and lowered to bring their terminals into and out of engagement with the insulated terminals 24 and 32 by suitable means which can include the screw threaded raising and lowering shafts 37.

The casing 10 is associated with one multiphase switching apparatus only and several such casings are disposed in line and are extended lengthwise of all of the switch apparatus of the switching system. Thus, each casing 10 comprises a section of the complete conductor enclosing casing for the switching system. The bus conductors 18 are terminated short of the end walls 36 of the casing 10 and are adapted to be connected with corresponding bus conductors of adjacent casing sections to complete the circuit throughout the length of the switching system.

In accordance with the present invention, the adjacent casing sections 10 of the various sets of switches of the system are connected together by flexible connecting means which establishes communication between the sections and which is capable of flexing and expanding and contracting to absorb variations in length of the casings without transmitting such variation from one casing to the other.

Figure 3:
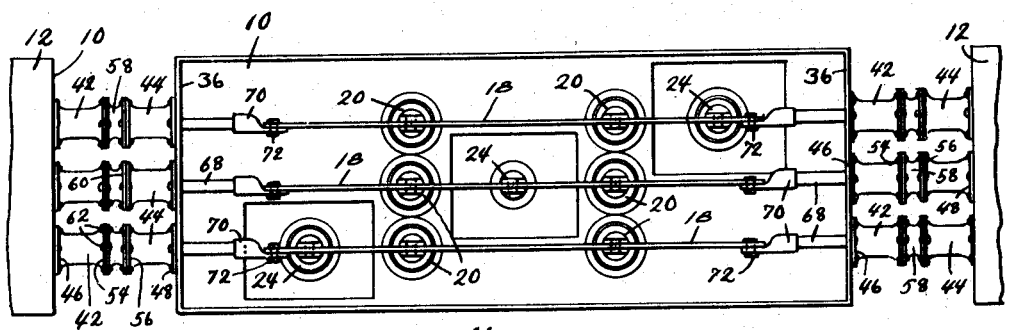
Fig. 3 is a plan view of one of the conductor and casing sections associated with a single multi-phase switching apparatus.
Figure 4:
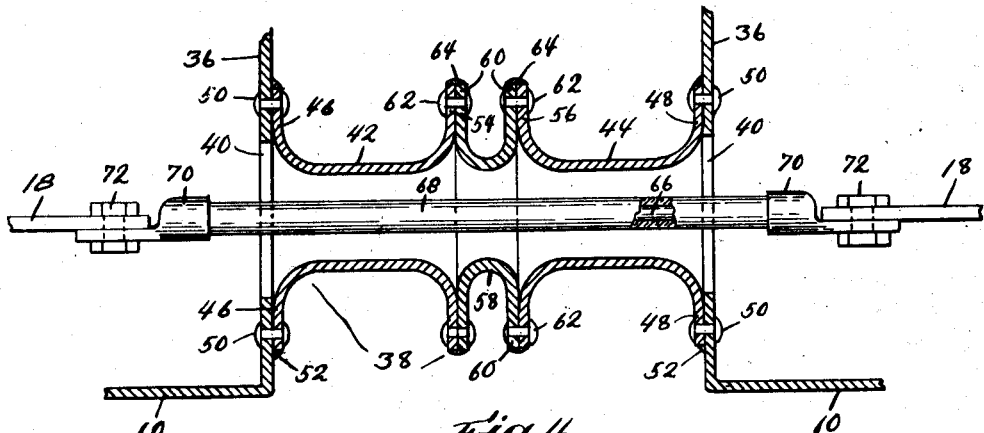
Fig. 4 is a sectional detail through the flexible casing and conductor-connecting means.

As shown in Figs. 1 and 3, the casing connecting means 38 is in tubular form and the construction thereof is most clearly shown in Fig. 4. The confronting end walls 36 of adjacent casings 10 are provided with aligned openings 40 which are also in line with the corresponding rigid bus conductors 18 of the casings. The connecting member 38 is located between the end walls 36 and is secured to both walls about the openings 40. The connecting member comprises two outer tubes 42 and 44 which have radially outstanding integral end flanges 46 and 48 respectively, that are secured to the end walls 36 in a fluid tight manner as by rivets 50 or by welding or brazing material 52, or both. The tubes 42 and 44 are also provided with similar outstanding integral flanges 54 and 56 at their confronting ends. A flexible or expansible tubular member 58 is located between said flanges and has outstanding flanges 60 that are secured by rivets 62 or welding or brazing material 64, or both, to the flanges 54 and 56. The wall of the member 58 is flexible and is adapted to yield in both directions lengthwise of the casing to permit the contraction and expansion of the casing sections 10 while maintaining fluid tight communication and connection therebetween. The tubes 42 and 44 are also preferably adapted to flex for the same purpose. Thus, the expansion and contraction of any one casing is limited to that casing and is not transmitted in a cumulative manner throughout the line of the casings. The expansion and contraction of any one casing is harmless since the casing is relatively short in length.

Means are provided also to connect the confronting ends of the bus sections 18 in a flexible manner so that variations in length of any one section are limited to such section and are not transmitted in a cumulative manner to other bus sections. The flexible connecting means includes a flexible cable or conductor 66 which is enclosed within an insulating sheath 68 that preferably has sufficient dielectric strength to resist being punctured by the normal potential impressed thereon. The ends of said cables are provided with terminal connectors 70 which are secured in any suitable manner as by means of bolts 72 to the confronting ends of the bus conductors 18. Said cables are extended through the flexible casing connecting members 38 and preferably are spaced from the side wall thereof and are surrounded by the oil or other insulating medium therein. Preferably, said cables extend through said casing connecting means with a slight sag so that the bus sections can expand and contract without hindrance from the cables. As thus arranged, the bus sections are free to expand and contract independently of adjacent sections.

The construction above described permits each bus section with its inclosing casing and supporting framework to be completely assembled at the factory by skilled workmen, and reduces the work of installation to a minimum, since each three phase switch unit can be installed practically independently of the associated units, no carefully prepared foundations and accurate alignment with adjacent units being necessary due to the flexible casing and conductor connections between units. The work of installation can therefore be done by unskilled workmen.

Figure 5:
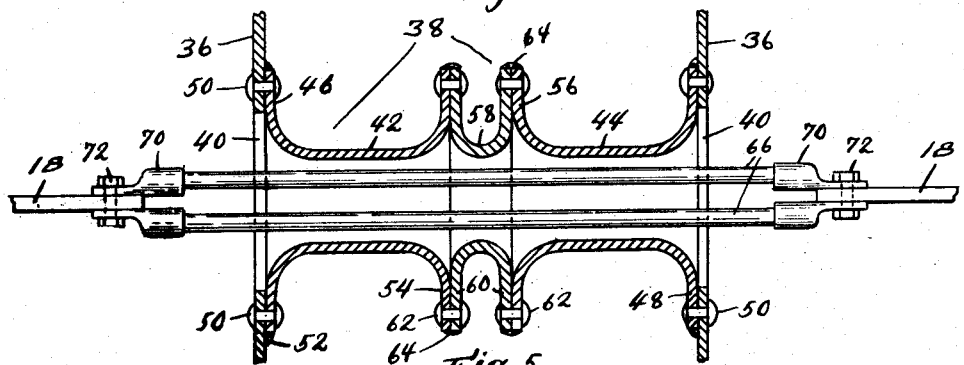
Fig. 5 is a view similar to Fig. 4 but showing the use of two parallel cables connecting the conductor-sections.

In systems where the current that traverses the bus conductors is high, a plurality of flexible cables 66 can be connected in parallel between the bus conductors of the adjacent sections as is illustrated in Fig. 5.

I claim:

1. Metal clad switch gear consisting of a plurality of sets of electric switching apparatus each having an independent conductor-inclosing casing that is free from rigid connection with all other casings, means connecting the confronting ends of said casings together in a flexible and fluid-communicating manner, and bus conductors having rigid conducting sections located in said casings and having flexible conducting sections which are located in said flexible connections and are connected with the adjacent ends of said rigid bus conducting sections.

2. Metal clad switch gear consisting of a plurality of sets of electric switching apparatus each having an independent conductor-inclosing casing that is free from rigid connection with all other casings, a separate rigid conductor contained in each casing and having its ends terminated short of the ends of the casing, means connecting the confronting ends of said casings together in a fluid tight manner, said connecting means being flexible in all directions and adapted to absorb variations in lengths of said casings due to expansion and contraction thereof, an insulating medium contained in said casings and in said flexible connecting means, and a flexible electric connector extended through said connecting means and detachably connected with the conductors of both casings.

3. Metal clad switch gear consisting of a plurality of sets of electric switching apparatus, each having an independent conductor-inclosing casing that is free from rigid connection with all other casing, a separate rigid conductor contained in each casing and terminated short of the ends of the casing, means connecting the confronting ends of said casings together in a fluid tight manner, said connecting means being flexible in all directions and adapted to absorb variations in lengths of said casings due to expansion and contraction thereof, an insulating medium contained in said casings and in said flexible connecting means, and an electric connector extended through said connecting means and connected detachably with the conductors of both casings, said electric connector being flexible and arranged to absorb variations in length of said connected conductors due to temperature changes thereof.

4. An electric switching system including the combination of a pair of separate conductor-inclosing casings which are free from rigid connection with each other, separate rigid conductors contained therein having terminals extended through said casings, electric switches connected with said terminals, universally flexible tubular means connecting confronting ends of said inclosing casings, and means flexibly connecting the conductors of said casings together and located in said flexible tubular means.

5. An electric switching system including the combination of a pair of separate conductor-inclosing casings which are free from rigid connection with each other, separate rigid conductors contained entirely therein having terminals extended through said casings, electric switches connected with said terminals, flexible tubular means connecting confronting ends of said inclosing casings and arranged to absorb variations in length of said casings, means flexibly connecting the conductors of said casings together and extended through said flexible tubular means, and an insulating medium contained in said casings and in said flexible tubular means.

6. An electric switching system including a pair of conductor inclosing casings that are free from rigid connection with each other having openings in confronting end walls thereof, sections of rigid bus conductors contained within said casings in line with said openings, switches associated with said conductors, means flexibly connecting said casings together in a fluid-communicating manner including a tube having a section which is adapted to yield laterally and also in the direction of the length of the tube, means securing the ends of said tube in a fluid tight manner to the end walls of said casings about the openings therein, and means flexibly connecting said conductors of said casings and extended through said flexible tube.

7. An electric switching system including a pair of conductor inclosing casings that are free from rigid connection with each other having openings in confronting end walls thereof, sections of rigid bus conductors contained within said casings in line with said openings, switches associated with said conductors, means flexibly connecting said casings together in a fluid-communicating manner including a tube having a section which is adapted to yield in the direction of the length of the tube, means securing the ends of said tube in a fluid tight manner to the end walls of said casings about the openings therein, and a flexible insulated cable extended freely through said tube in spaced relation with the side wall thereof and connected with the conductors of each casing, and an insulating compound contained in said casings and in said tube.

8. Electric switching apparatus including a pair of conductor inclosing casings that are free from rigid connection with each other having spaced and confronting end walls, separate sections of rigid bus conductors contained entirely within said casings, switches associated with said conductors, means connecting the confronting ends of said casings flexibly together in a fluid tight manner, having provision for yielding in the direction of the lengths of said casings, and a flexible insulated cable extended through said flexible connecting means and having connections with the conductors of both casings.

9. Electric switching apparatus including a pair of conductor inclosing casings that are free from rigid connection with each other having spaced and confronting end walls, separate sections of rigid bus conductors contained entirely within said casings, switches associated with said conductors, means connecting the confronting ends of said casings flexibly together in a fluid tight manner, having provision for yielding in the direction of the lengths of said casings, and a plurality of independently flexible insulated cables extended freely through said flexible connecting means and having connections with the conductors of both casings.

In testimony whereof, I have signed my name to this specification.

CHESTER D. AINSWORTH.